June 30, 1959
A. E. MARKHAM
2,892,757
PURIFICATION OF ALCOHOL
Filed Nov. 14, 1955
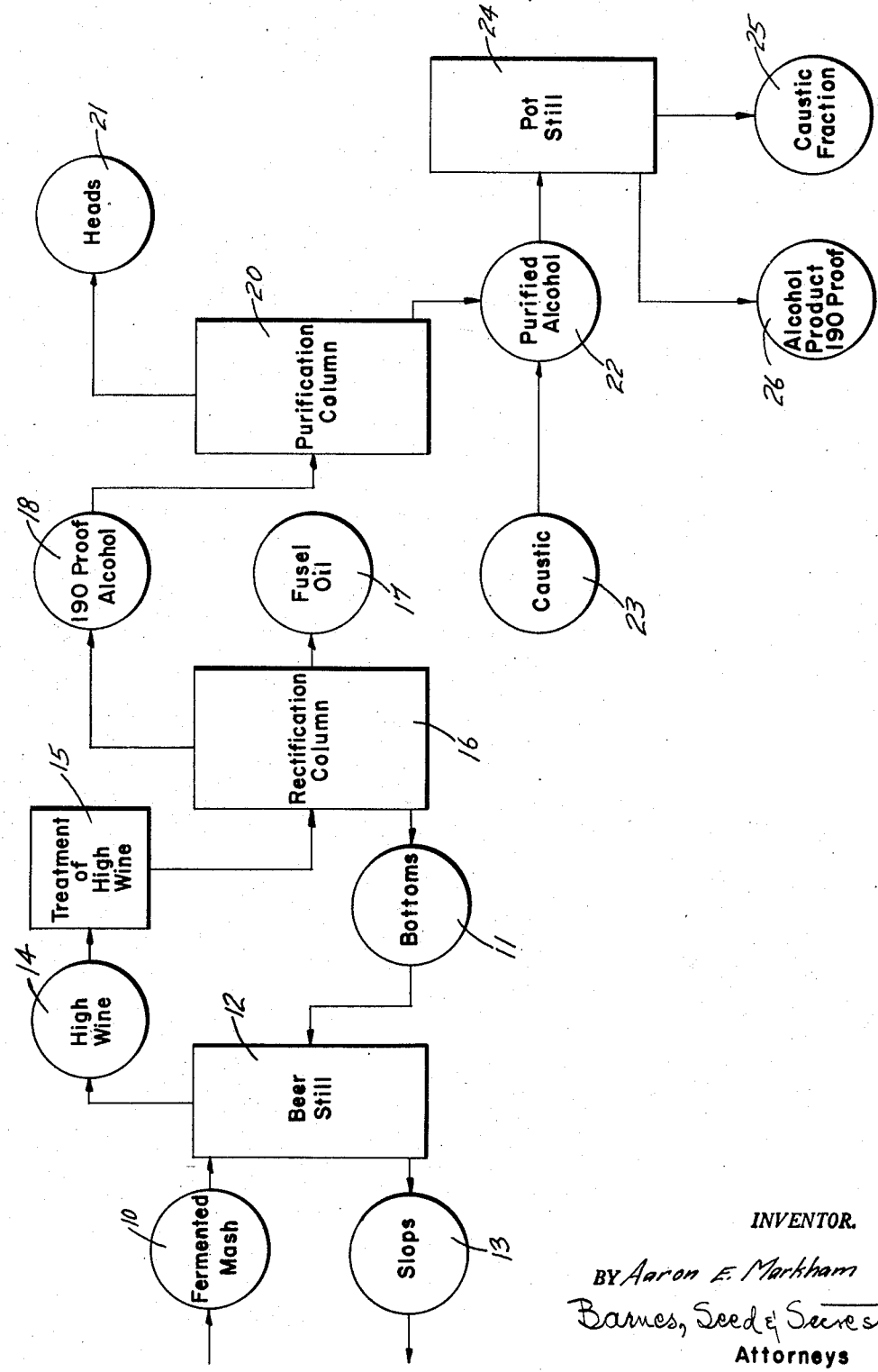
INVENTOR.
BY *Aaron E. Markham*
*Barnes, Seed & Secrest*
Attorneys

United States Patent Office 2,892,757
Patented June 30, 1959

2,892,757

PURIFICATION OF ALCOHOL

Aaron E. Markham, Bellingham, Wash., assignor to Puget Sound Pulp and Timber Co., Bellingham, Wash., a corporation of Delaware Application November 14, 1955, Serial No. 546,331

9 Claims. (Cl. 195—39)

This discovery relates to the manufacture and the purification of alcohol and, more particularly, to a process for manufacturing and purifying alcohol prepared from the fermentation of sugar-containing substances such as those derived from wood, molasses, cereal grains like wheat, rye and barley, potatoes, corn and the spent liquor derived from the sulfite pulping of wood or other fibrous material (hereinafter referred to simply as spent sulfite liquor).

In the manufacture of ethyl alcohol by the fermentation processes sugar-containing substances are fermented to give a fermented mash or beer which, in turn, is distilled or fractionated in a "beer still" to form an alcohol solution having a higher alcohol content. This alcohol solution is referred to as a high wine and generally varies in strength from about 30 to 70 proof. In addition to the alcohol and the water therein the alcoholic solution comprises contaminants such as fusel oil, aldehydes, low boiling and high boiling esters, acetals, hemi-acetals and unidentified compounds. These contaminants are inherent in the fermentation processes. Most of the contaminants are removed from the alcohol solution by some purification process and the use to which the alcohol is placed determines the degree to which the alcohol must be free of odor and taste producing contaminants. In the manufacture of high-grade industrial alcohol the generally accepted methods include the use of distillation or fractionation equipment for increasing the concentration of the alcohol. Briefly, and prior to my invention, a general method for manufacturing industrial alcohol comprises the fractionation of the high wine in a rectifying column. The output of the rectification column comprises an overhead fraction which may be as concentrated as 190 proof alcohol, a bottom fraction which goes to the beer still for further alcohol recovery, and a side draw-off of fusel oil. As the overhead fraction contains impurities such as aldehydes, high and low boiling esters, acetals, hemi-acetals and unidentified compounds and also possesses an undesirable odor or odors this fraction is purified in a purification column wherein an alcoholic solution of higher purity than the incoming overhead fraction is drawn from or near the bottom and a top fraction comprising the above-identified impurities is drawn from or near the top of the column. In certain instances the alcoholic solution of higher purity still contains impurities or contaminants which lower the quality and these therefore must be removed. The alcoholic solution of higher purity is further treated in one or more additional purification columns so as to remove these contaminants. Also, the alcoholic solution of higher purity may contain some acidic components. These acidic components are removed by adding a caustic such as sodium hydroxide to the alcoholic solution and then distilling off the alcohol. However, even with all of these fractionation steps and the careful separation of the fractions the purified alcohol is not as pure as desired, and contains some odoriferous impurities which lower the quality and consequently the selling price of the same. With this in mind I have invented a process for purifying alcohol so as to decrease the concentration of those impurities which impart undesirable odors and, thereby, to raise the quality of said alcohol. Also, my process results in certain economies in the production of high-quality alcohol by replacing expensive additional distillation steps and apparatus or the activated charcoal treatment of the alcoholic solution with less expensive process steps and apparatus presently to be presented.

Briefly, my process comprises the heating of the high wine at an elevated temperature, say above 60° C., for a prolonged period of time. The lower the temperature of heating the longer the required time of heating. After the heating step the high wine may be further treated to give a purified alcohol.

Accordingly, it is an object of this invention to provide a process for purifying alcohol and, in particular, to improve the quality of the alcohol by decreasing the concentration of those contaminants giving rise to undesirable odors.

An additional object is to provide a process for removing oils in the high wine and the resulting alcohol.

A still further object is the provision of a process for raising the pH of the alcoholic solutions and, especially, the high wine.

Another important object is to provide a process for purifying alcohol and which process is more economical than alternative processes now being practiced to achieve an equivalent result.

Various other and ancillary objects and advantages of the present invention will become apparent from the following description and explanation of the present invention.

In the accompanying drawing:

The drawing is a flow-sheet of the process for fractionating fermented mash or beer into the alcohol product.

Prior to describing my invention in detail I will present an outline for the manufacture of alcohol particularly from spent sulfite liquor. In the manufacture of pulp and cellulose fibers chips of a suitable wood such as hemlock, alder, white fir, etc., are cooked under presure in an aqeous bisulfite solution, such as calcium bisulfite solutions containing excess sulfur dioxide, until the cooking step is completed and at which time the solids and liquids are transferred to the blowpits. In the blowpits the fibers and cooking liquor, now spent sulfite liquor, are separated, and the spent sulfite liquor further treated to remove any remaining fibers. The clarified spent sulfite liquor then passes to a steam stripping column wherein the sulfur dioxide is removed at the top of the column and the stripped spent sulfite liquor exits of the bottom. If necessary, there is added to this stripped liquor a lime slurry to raise the pH to about 3.8 or above and then the liquor is passed to a flush cooler wherein some of the water is removed. Upon leaving the flash cooler nutrients may be added to the stripped liquor before it passes to a fermenter. In the fermenter there is added to the liquor a yeast cream which is rich in yeast, and the liquor is agitated to insure thorough mixing of the yeast and the liquor. As is well-known, the yeast attacks the sugars in the liquor and converts them to ethyl alcohol. Also, as is well-known, these sugars are a product of the reaction between the wood and the cooking liquor. In addition to converting the sugars to alcohol there are aso produced aldehydes, low and high boiling esters, fusel oil, acetals and hemi-acetals, and unidentified compounds. The fermented liquor is pumped to a centrifugal separator wherein the yeast is separated from the liquor so as to make the yeast cream and clarified beer. The latter is fractionated in a "beer still" to high wine. As the preceding process and its modifications are well-known in the prior art they do not constitute part of my invention. In fact, a more complete description of the same may be found in Kirk-Othmer's "New Chemical Encyclopedia," pages 274–277, 1947 edition, published by The Interscience Encyclopedia, N.Y. As one of the conventional practices for purifying the high wine into alcohol has already been presented, the same will not be presented here.

With this background for the manufacture of high wine from sugar-containing substances and, especially from a spent sulfite liquor, I will now turn to my discovery and a more particular description of the same. As previously stated the high wine resulting from the fermentation process contains impurities such as fusel oil, acetals, hemi-acetals, esters, and unidentified compounds, and as a result of these impurities the high wine possesses an undesirable odor. Unfortunately, some of the impurities and the accompanying undesirable odors are carried through the conventional purification steps so as to lower the quality of the alcohol product.

The basic cause of the undesirable odor, as has been previously pointed out, is not known. However, even with the lack of this knowledge I have discovered that some of the impurities can be removed by heating the high wine at a temperature of about 60° C. or above for a prolonged period of time. The higher the temperature the less time is required for heating.

To be more explicit, in carrying out this process the pH of the high wine is adjusted to a low value, less than about 4. In so adjusting the pH I have found that there should be some sulfur dioxide present in the high wine. Preferably some of the sulfur dioxide should be present in the free state in the high wine, i.e., dissolved therein. High wine obtained from the fermentation of spent sulfite liquor usually contains sulfur dioxide and other acids in sufficient quantity to lower the pH to the desired range. However, if necessary, a mineral acid such as sulfuric acid may be employed to lower the pH as above indicated. If the high wine is a product of spent sulfite liquor there is inherent in the high wine some sulfur dioxide as it is impossible to remove all of this gas from the sulfite liquor in the steam stripping step. Generally speaking, the pH of the high wine having its origin in the spent sulfite liquor is in the range of 1.8–2.2. A possible contributing factor to this high acidity is the presence of organic acids, sulfur dioxide as sulfurous acid, and sulfuric acid from the oxidation of sulfur dioxide.

With the pH adjusted I then heat the high wine at an elevated temperature for a period of time sufficient, upon the subsequent distillation of the high wine, to free the alcohol of the major portion of the contaminating impurities. For example, with an increase in the temperature there is a decrease in the heating time. To be more explicit, heating the wine at about 150° C. for about five minutes produces results apparently equal to a temperature of 110° C. for one hour, 80° C. for seven hours, or 60° C. for twenty hours.

The equipment for carrying out the heating can take any of a number of forms such as a container for batch treatment, or a pipe or other vessel suitable for the continuous flow of the alcohol solution while it is maintained at the elevated temperature.

So as to more clearly point out my discovery with respect to the continuous process for manufacting alcohol by the fermentation process reference should be made to the drawing which pictorially illustrates the flow-sheet for said process. A fermented mash or beer 10 and a recycled bottoms 11 are fed into a beer still 12 wherein these input materials are fractionated into a slops 13 and a high wine 14. Generally speaking the materials undergoing fractionation are in the beer still for about one-half hour and the high wine leaves the same at a temperature of about 80° C. The slops exits from the bottom of the beer still and the high wine from the top or a point near the top. This high wine, 30–70 proof, is then treated at 15. One form of treatment is to heat the high wine at an elevated temperature as previously indicated to form a heated high wine from which in the subsequent fractionation steps the alcohol product is more completely freed of most of the contaminants. This treated or heated high wine is then introduced into a rectification column 16 wherein the same is fractionated into the bottoms 11, a fusel oil 17 and an alcohol 18 approaching 190 proof. The bottoms is a bottom draw-off from the rectification column, the fusel oil is by a side draw-off, and the 190 proof alcohol is a top draw-off. The fusel oil fraction comprises fusel oil, alcohol, and water. In order to purify the 190 proof alcohol the same is introduced into the purification column 20 wherein the same is separated into a heads fraction 21 and a purified alcohol 22. The heads fraction is a top draw-off of this column and comprises acetals, hemi-acetals, methanol, esters and unidentified compounds. The purified alcohol is 190 proof and is drawn from or near the bottom of the purification column. In certain instances this purified alcohol contains acidic components. So as to employ this alcohol in particular uses it is mandatory that these acidic components be removed. Therefore, a caustic 23, such as a 20% solution of sodium hydroxide, is added to the purified alcohol 22 to make an alkaline alcohol. This alkaline alcohol is introduced into a pot still 24 wherein the same is fractionated into a caustic fraction 25 and an alcohol product 26. The caustic fraction is an aqueous solution of the caustic and a salt of the caustic and the acidic components and is a bottom draw-off from the pot still. The alcohol product is a top draw-off of said still, is 190 proof, and is substantially free of the acidic components and other contaminants. As a further word in the above process, the rectification column, the purification column, and the pot still are operated at atmospheric pressure with the draw-off temperatures of 190 proof alcohol 18, the purified alcohol 22, and the alcohol product 26 commensurate with such pressure.

Returning now to the heating of the alcoholic solution, the high wine, the period of time for heating is commensurate with the temperature of heating in order to free the alcoholic solution by the subsequent distillation steps of contaminants having undesirable odor characteristics. As previously stated the higher the temperature of the heating the shorter the time period of the heating.

The conventional test for determining the purity and the odor characteristics of alcohol and also of the high wine is the odor test. This test depends upon the opinions of the individual members of a test panel. Briefly, the test comprises diluting the original alcohol samples with distilled water to make diluted alcohol samples containing 15% of alcohol by volume. Next, 50 ml. of each diluted solution is placed in a 250 ml. wide mouth Erlenmeyer flask, and when not in use the flasks are stoppered with stoppers covered with fresh aluminum foil. After the samples have reached room temperature, which is preferably warm, several people (the odor panel) smell each sample and rate them according to their odor characteristics. The rating is done independently by each person and the results of the rating are tabulated and averaged to form the composite rating of the panel. A standard sample is included in each group of samples to establish a basis for comparison.

The odor test is a subjective test and is not always entirely satisfactory, particularly when it is desired to record the quality of a product in terms of numbers for comparison of future samples. A test for alcohol purity which we have found useful for this purpose is the measurement of the extent to which it absorbs ultraviolet light, or, as it is called, the optical density. A higher optical density is indicative of a higher concentration of impurities which absorb ultraviolet light. Although the absorption of ultraviolet light covers a substantial range of wave length, we have usually simplified the test by recording the optical density at only two wave lengths, namely, 220 and 250 millimicrons. These measurements are made by well known methods and since they are understood by those skilled in the art need no further elaboration.

In order to show more explicitly the advantages of my discovery the optical density readings of the alcohol product for the five days immediately preceding the introduction of my discovery into the alcohol purification process and for the five days immediately succeeding said introduction are presented in the following Table No. I. These data show considerably less ultra-violet absorption by the alcohol product for the five days immediately succeeding said introduction than for the alcohol product for the five days immediately preceding said introduction.

TABLE NO. I

*Ultra-violet absorption of the alcohol product*

OPTICAL DENSITY AT THE WAVE LENGTH OF 220 MILLIMICRONS

| Days Preceding Heat Treatment | | | | | Days Succeeding Heat Treatment | | | | |
|---|---|---|---|---|---|---|---|---|---|
| 5 | 4 | 3 | 2 | 1 | 0 | 1 | 2 | 3 | 4 | 5 |
| 0.83 | 0.90 | 0.73 | 0.76 | 0.87 | 0.25 | 0.20 | 0.205 | 0.21 | 0.22 |

OPTICAL DENSITY AT THE WAVE LENGTH OF 250 MILLIMICRONS

| Days Preceding Heat Treatment | | | | | Days Succeeding Heat Treatment | | | | |
|---|---|---|---|---|---|---|---|---|---|
| 5 | 4 | 3 | 2 | 1 | 0 | 1 | 2 | 3 | 4 | 5 |
| 0.15 | 0.18 | 0.17 | 0.15 | 0.13 | 0.05 | 0.05 | 0.05 | 0.05 | 0.05 |

This reduction in the optical density of the alcohol product corresponds with almost complete removal of the objectionable odors as indicated by the conventional odor test already described. The data in the above table are for an alcohol product manufactured by the process illustrated by the flow-sheet in the accompanying drawing. In this process the heat treatment step 15 of the high wine 14 at a pH of 2, comprises heating the same in the temperature range of 105–110° C. for approximately one hour prior to the rectification and purification steps.

So as more fully to illustrate the advantages of my heat treating process I will now turn to specific examples. However, even though the following specific examples are presented it is to be understood that they are for purposes of illustration only and are not to be interpreted as limitations of my discovery.

EXAMPLE NO. I

An alcohol product 26 was produced according to my outlined process. The high wine 14 in this process was a product of the fermentation and distillation of spent sulfite liquor. This high wine possessed a pH of approximately 2.0 and was heat treated for about one hour in the temperature range of 105–110° C. prior to rectification and purification. The alcohol product was tested by the conventional odor test and possessed a greatly improved odor characteristic, i.e., this was interpreted to mean that the concentration of undesirable contaminants in the alcohol had been reduced.

EXAMPLE NO. II

In this example a high wine 14, prepared by the fermentation of spent sulfite liquor and having a pH of about 2.0 was heated at approximately 60° C. for nearly 20 hours. By the conventional odor test the heated high wine possessed a much more desirable odor than the unheated or untreated high wine.

EXAMPLE NO. III

A high wine 14 prepared by the fermentation of spent sulfite liquor and possessing a pH of about 2.0 and 33.60% alcohol by volume was heated at 110° C. for various periods of time as indicated in the following Table II.

TABLE NO. II

*Heat treatment of high wine*

| Odor Characteristics | Sample No. | Heating Time at Max. Temp. (110° C.) (minutes) | Initial pH | Final pH |
|---|---|---|---|---|
| Best | Equal { 4 | 120 | 2.0 | 2.0 |
| ↑ | 3 | 60 | 2.0 | 2.0 |
| | 2 | 30 | 2.0 | 2.1 |
| ↓ | 1 | 15 | 2.0 | 2.0 |
| Poorest | Blank | not heated | 2.0 | |

The conventional odor test was applied to each of these heated samples and from this test it was determined that the odor characteristics of samples 3 and 4 were substantially equal. Furthermore, the odor characteristics of samples 3 and 4 were superior to said characteristics of sample 2, which was superior to sample 1. And, the odor characteristics of samples 1, 2, 3 and 4 were superior to the unheated high wine or the blank sample. This result is interpreted as showing that the improvement obtained by heating increased during about the first 60 minutes of heating.

EXAMPLE NO. IV

A high wine manufactured by the fermentation process from spent sulfite liquor was heated at an elevated temperature of about 150° C. This high wine possessed a pH of about 2.05 and comprised 26.9% by volume of ethanol. Briefly, four samples of the high wine were heated at about 150° C. for various periods of time and then the conventional odor test applied to these samples. More specifically, in carrying out these tests the high wine was sealed in bombs and the bombs were heated for about five minutes in a water bath having a temperature of 95° C. and then the bombs were transferred to an oil bath having a temperature of 150° C. From previous experience it was estimated that it took about 10 minutes for the bomb and the high wine therein to reach the maximum temperature of 150° C. These results are summarized in the following Table No. III.

TABLE NO. III

*Heat treatment of high wine*

| Sample No. | Total Heating Time in Oil Bath (150° C.) (minutes) | Estimated Heating Time at Maximum Temperature (150° C.) (minutes) |
|---|---|---|
| 1 | 15 | 5 |
| 2 | 20 | 10 |
| 3 | 30 | 20 |
| 4 | 50 | 40 |

By the odor test all of the heated samples of the high wine were approximately equal and the odor of all the heated samples was much improved in comparison with the unheated high wine. These results indicate that a very short heating at a high temperature is sufficient to impart to the high wine a more desirable odor.

Turning now to another phase of treatment of the high wine I have found that the combination of heating the high wine, raising the pH, and then filtering the same also imparts desirable odor characteristics. In fact, the raising of the pH of the high wine and the subsequent filtration imparts desirable odor properties apart and separate from the heating. For example, a high wine prepared by the fermentation of spent sulfite liquor and having a pH of about 2.0 and comprising 25–30% by volume of alcohol was heated at 80° C. for 16 hours. This heated high wine was split into a first fraction and into a second fraction. The second fraction was filtered through a bed of crushed limestone having a particle size in the range of 60–120 mesh. The conventional odor test was applied to the first fraction, the filtered second fraction and the untreated high wine. By this test the filtered second fraction had much more desirable odor charactertistics than the unfiltered second fraction, which in turn possessed much more desirable odor characteristics than the untreated high wine. As is readily realized, the passing of the high wine through the crushed limestone simultaneously raises the pH of the alcoholic solution and filters the same.

In order to illustrate further my process I herewith present specific examples. These examples combine the steps of heating the high wine, raising the pH, and filtering the same (these last two steps may be combined into one operation). However it is to be understood that examples are for illustrative purposes and are not to be interpreted as limitations on my process.

EXAMPLE NO. V

A high wine prepared from fermented spent sulfite liquor, said high wine possessing a pH of about 2.0 and comprising 25–30% alcohol, was heated in the temperature range of 105–110° C. for approximately one hour. Then the heated high wine was flowed through a column of a particular material such as soapstone, olivine, silica, limestone, or cellulose. This particular material was of such a size as to pass through a 40 mesh screen, i.e. 40 meshes per inch, with the exception of the cellulose, which was a bleached short fiber sulfite wood pulp. The data for this filtration of the heated high wine are summarized in following Table No. IV.

TABLE NO. IV

*Filtration of heated high wine*

| Material | Column Volume (ml.) | Oven Dry Wt. (gm.) | Flow Rate (ml./min.) | Contact Time (minutes) | Final pH |
|---|---|---|---|---|---|
| Heated High Wine | | | | | 2.35 |
| Cellulose | 54 | 4.6 | 2.3 | 24 | 2.4 |
| Silica | 30 | 36.9 | 1.2 | 25 | 2.9 |
| Olivine | 30 | 51.3 | 0.7 | 43 | 3.85 |
| Soapstone | 31 | 38.5 | 0.8 | 39 | 4.3 |
| Limestone (A) | 28 | 39.4 | 1.4 | 20 | 7.3 |
| Limestone (B) | 31 | 38.6 | 1.3 | 24 | 7.5 |

The samples of the heated high wine which were filtered were tested for odor characteristics by the previously outlined odor test. By this odor test these filtered, heated, high wine samples produced results as outlined in Table No. V.

TABLE NO. V

*Odor characteristics of filtered heated wine samples*

| Odor Characteristics | Sample |
|---|---|
| Best | same {(Limestone) (A) / (Limestone) (B)} |
| ↑ | (Soapstone) = (Olivine) |
| | (Silica) |
| ↓ | (Cellulose Pulp) |
| Poorest | (Heated High Wine) |

As a sidelight on these results it is to be noted that the higher the final pH the better the odor characteristics and, conversely, the lower the final pH the poorer the odor characteristics. Filtration without raising the pH effects no substantial improvement. It is to be emphasized, however, that the improvement in odor is not achieved simply by adding alkali to raise the pH, but by the combined action of raising the pH and filtering.

EXAMPLE NO. VI

A high wine prepared from the fermentation of spent sulfite liquor, having a pH of about 2.0 and comprising from 25–30% alcohol by volume, was heated at approximately 80° C. for 15 to 16 hours. Half of the heated high wine sample was filtered at a temperature of 65° C. through a bed of crushed limestone and the other half was filtered through a bed of crushed limestone at room temperature. A major part of the crushed limestone was in the size range of 60–120 mesh. Both of the filtered samples and the untreated high wine were tested for odor characteristics, and both of the filtered samples were substantially improved in odor characteristics as compared with the untreated high wine.

EXAMPLE NO. VII

The heated high wine samples of Example No. IV were further treated by passing them through crushed limestone, the limestone being in the 60–120 mesh range size. All of these filtered high wine samples, those samples heated at 150° C. for approximately 5, 10, 20 and 40 minutes, were tested for odor characteristics as previously outlined. The difference in the odor characteristics of the filtered heated high wine samples were so slight as not to be perceptible, but the odor characteristics of these filtered heated high wine samples were considerably improved in comparison with the odor characteristics of both the heated high wine samples and the untreated high wine samples of Example No. IV. The final pH of the filtered heated high wine samples ranged from 6.9 to 7.1. Again, it is to be noted that the odor characteristics of all filtered heated high wine samples are substantially equal therefore indicating that the high wine may be heated at 150° C. for five minutes or possibly even less and still achieve the desideratum of the heating step.

At the present time the reaction mechanism for explaining the purification of the high wine and the lessening of the undesirable odor is not known. However, even though the reaction mechanism is not known, it is possible to state that the presence of free sulfur dioxide, i.e., sulfur dioxide which is not combined to form a salt, in the high wine while being heated is desirable as in the absence of the same the low acidity of the high wine is not as effective as in the presence of the sulfur dioxide. In order to illustrate more fully the importance of having free sulfur dioxide in the high wine and also a low pH, a high wine was treated in various ways. This high wine was prepared from spent sulfite liquor by the fermentation process and had a pH of about 2.0. To 220 ml. samples of the high wine were added reagents such as sulfuric acid or sodium hydroxide to adjust the pH and the samples heated at 80° C. for 16 hours. Then the conventional odor test was applied to the samples. The results of this analysis are in the following Table No. VI.

TABLE NO. VI

*Heating of high wine*

| Odor Characteristics | Reagent Added to 220 ml. of High Wine | pH Before Heating | Time at 80° C. (hours) | pH After Heating |
|---|---|---|---|---|
| Best | 0.5 cc. of 2N H$_2$SO$_4$ | 1.4 | 16 | 1.2 |
| ↑ | Nothing Added | 2.0 | 16 | 1.4 |
| | 2 ml. of 1N NaOH | 4.2 | 16 | 2.7 |
| ↓ | NaOH | 6.5 | 16 | 5.9 |
| Poorest | 7 Ml. of 1N NaOH | 12.0 | 16 | 12.1 |

Again, it is to be noted that those samples having the lower pH values during heating have more desirable odor characteristics and, conversely, those samples having the higher pH values during heating have the less desirable odor characteristics. From these facts it is possible to hypothesize that there may be a two-fold effect; first, an effect from the hydrogen ion which is present because of the low pH; and second, some specific effect or effects due to sulfur dioxide.

In regard to the beneficial effect achieved by the raising of the pH of the high wine and the filtering of the same, the reasons for such beneficial effects are unknown. However, it may be surmised that the high wine is an emulsion comprising oil. This oil may include fusel oil as well as unidentified compounds. These compounds may be eliminated in part by passing the high wine through such filtering media as diatomaceous earth, cellulose, etc., but it is the finding of this invention that an unexpected absorption of the objectionable odoriferous materials is observed on limestone, and to a lesser extent on soapstone and olivine. Treatment with these materials serves in one operation both to raise the pH of the high wine and to filter or absorb material from the high wine. Upon the addition of an alkali to the high wine the pH is raised and the emulsion may be broken with the result that the oil collects in droplets. These oil droplets are removed by filtering the high wine through a porous material such as cellulose or finely crushed solids. If the finely crushed solids be limestone then in one operation the pH of the high wine is raised and oil droplets filtered out of the same.

In the above examples the pH of the alcoholic solutions was obtained with the aid of the glass electrode in the manner generally so employed for obtaining pH values, and therefore will not be explained in greater detail. The alcoholic content of both the high wine and the alcohol product are arrived at by taking the density of the particular alcoholic solution and then from published data determining the percent by volume of the alcohol. In the instance of the high wine the same may be first neutralized, the volatile materials distilled, and then the density taken to determine the alcohol content. Normally speaking, in the high wine there is from 25–30% by volume of alcohol. It is to be realized that at the higher temperatures the heating of the high wine and the passing of the same through the limestone must be carried out in pressure vessels. In regard to the materials of construction for the fractionating columns and related apparatus I have found it desirable to employ a stainless steel such as 316 stainless.

Obviously many modifications and variations of the invention as hereinbefore set forth may be made without departing from the spirit and scope thereof and therefore only such limitations should be imposed as are expressly recited in the appended claims.

I claim:

1. A process for improving the quality of alcohol prepared by the fermentation of sugar containing substances to produce the alcohol, said process comprising the step of fractionating liquor containing the alcohol from said fermentation of sugar containing substances to a high wine, the step of heat treating the high wine at a temperature in the range of approximately 60° C. to 150° C., said heat treating time ranging from approximately 20 hours at 60° C. to about 5 minutes at approximately 150° C., the pH of the high wine being heat treated not exceeding about 4, pH adjustment being made therefore, if necessary; and removing oily materials from the heat treated high wine prior to the step of fractionating the high wine for recovery of the alcohol content therein.

2. A process for improving the quality of alcohol prepared by the fermentation of spent sulfite liquor, said process comprising the step of fractionating a fermented spent sulfite liquor containing the alcohol to a high wine, the step of heat treating the high wine at a temperature in the range of approximately 60° C. to 150° C. to bring forth oily materials in the high wine, the heating time ranging from about 20 hours at about 60° C. to approximately 5 minutes at approximately 150° C., and the step of removing the oily materials from the high wine.

3. A process for improving the quality of alcohol prepared by the fermentation of spent sulfite liquor, said process comprising the step of fractionating a fermented spent sulfite liquor containing the alcohol to a high wine of 30 to 70 proof, the step of adjusting the pH of the high wine to a pH less than about 4, the step of heat treating the high wine at a temperature in the range of about 60° C. to 150° C. to bring forth oily materials in the high wine, the heating time varying from about 20 hours at 60° C. to about 5 minutes at 150° C., and the step of removing the oily materials from the high wine.

4. A process for improving the quality of alcohol prepared by the fermentation of spent sulfite liquor, said process comprising the step of fractionating a fermented spent sulfite liquor containing the alcohol to a high wine of 30 to 70 proof, the step of adjusting the pH of the high wine to a pH less than about 4, the step of heat treating the high wine at a temperature in the range of approximately 60° C. to 150° C. to bring forth oily materials in the high wine, the heating time varying from about 20 hours at 60° C. to about 5 minutes at 150° C., and the step of removing the oily materials from the high wine by filtering the treated high wine through limestone particles.

5. A process for improving the quality of alcohol prepared by the fermentation of spent sulfite liquor, said process comprising the step of fractionating a fermented spent sulfite liquor containing the alcohol to a high wine of 30 to 70 proof, the step of heat treating the high wine at a temperature in the range of approximately 60° C. to 150° C. to bring forth oily materials in the high wine, the heating time varying from about 20 hours at 60° C. to about 5 minutes at 150° C., and the step of removing the oily materials from the high wine by settling the same from the high wine.

6. A process for improving the quality of alcohol prepared by the fermentation of spent sulfite liquor, said process comprising the step of fractionating a fermented spent sulfite liquor containing the alcohol to a high wine having an alcohol content in the range of 30 to 70 proof, the pH of the high wine being below about 4.0, the step of heating the high wine in the temperature range of approximately 105° C. to 110° C. for a period of time commensurate with the temperature to bring forth oily materials in the high wine, the step of removing the oily materials from the high wine, and the step of fractionating the high wine to the alcohol.

7. A process for improving the quality of alcohol prepared by the fermentation of spent sulfite liquor, said process comprising the step of fractionating a fermented spent sulfite liquor containing the alcohol to a high wine, said high wine having an alcohol content in the range of 30 to 70 proof, the step of heat treating said high wine in the temperature range of approximately 105° C. to 110° C. for at least about 30 minutes to bring forth oily materials in the high wine, and the step of removing oily materials from the high wine.

8. A process for improving the quality of alcohol prepared by the fermentation of spent sulfite liquor, said process comprising the step of fractionating a fermented spent sulfite liquor containing the alcohol to a high wine, said high wine having an alcohol content in the range of 30 to 70 proof, the step of heat treating said high wine in the temperature range of approximately 105° C. to 110° C. for at least about 30 minutes to bring forth oily materials in the high wine, the step of removing the oily materials from the high wine, and the step of fractionating the high wine to free the alcohol.

9. A process for improving the quality of alcohol prepared by the fermentation of spent sulfite liquor, said process comprising the step of fractionating a fermented spent sulfite liquor containing the alcohol to a high wine of 30 to 70 proof, the step of heat treating the high wine at a temperature in the range of about 60° C. to 150° C. to bring forth oily materials in the high wine, the heating time varying from about 20 hours at 60° C. to about 5 minutes at 150° C., and separating the oily materials from the high wine.

References Cited in the file of this patent

UNITED STATES PATENTS

| | | |
|---|---|---|
| Re. 21,727 | Rodenberg | Feb. 25, 1941 |
| 1,284,740 | McKee | Nov. 12, 1918 |
| 1,312,293 | Willcox | Aug. 5, 1919 |
| 2,663,426 | Wilson et al. | Dec. 22, 1953 |